(12) United States Patent
Kolodner et al.

(10) Patent No.: US 8,025,271 B2
(45) Date of Patent: Sep. 27, 2011

(54) DIRECTED-FLOW CONDUIT

(75) Inventors: Paul Robert Kolodner, Hoboken, NJ (US); Avinoam Kornblit, Highland Park, NJ (US); Thomas Nikita Krupenkin, Middleton, WI (US); Alan Michael Lyons, New Providence, NJ (US); Todd Richard Salamon, Chatham, NJ (US)

(73) Assignee: Alcatel Lucent, Paris (FR)

( * ) Notice: Subject to any disclaimer, the term of this patent is extended or adjusted under 35 U.S.C. 154(b) by 844 days.

(21) Appl. No.: 12/080,409

(22) Filed: Mar. 31, 2008

(65) Prior Publication Data
US 2009/0242036 A1 Oct. 1, 2009

(51) Int. Cl.
*B01F 3/04* (2006.01)
(52) U.S. Cl. ............... 261/76; 55/435; 366/336
(58) Field of Classification Search ............ 261/76; 55/435, 440; 366/336
See application file for complete search history.

(56) References Cited

U.S. PATENT DOCUMENTS

| 4,964,733 A * | 10/1990 | Fredriksson et al. ......... 366/336 |
| 7,048,889 B2 | 5/2006 | Arney et al. ................ 422/68.1 |
| 2007/0224391 A1 | 9/2007 | Krupenkin et al. ........... 428/141 |

OTHER PUBLICATIONS

Apr. 21, 2006, Linke et al., "Self-Propelled Leidenfrost Droplets," Physical Review Letters, vol. 96, pp. 154502-1 through 154502-4.
Jun. 5, 2006, Henoch et al., "Turbulent Drag Reduction Using Superhydrophobic Surfaces," 3rd AIAA Flow Control Conference, San Francisco, Calif., paper 2006-3192, pp. 1-5.
Nov. 5, 2005, Salamon et al., "Numerical Simulation of Fluid Flow in Microchannels with Superhydrophobic Walls," Proceedings of IMECE2005, IMECE2005-82641, Orlando, Florida, pp. 1-11.
U.S. Appl. No. 12/080,408, Basavanhally et al., filed Mar. 31, 2008.

* cited by examiner

*Primary Examiner* — Robert A Hopkins
(74) *Attorney, Agent, or Firm* — Jay M. Brown

(57) ABSTRACT

Device including channel having channel input and output. Channel has interior channel surface extending along channel path from channel input to output. In one implementation, channel includes plurality of channel sections in serial communication along channel path. Each of channel sections includes first internal circumference spaced apart along channel path from second internal circumference, in each of channel sections the first and second internal circumferences being substantially different. Each of channel sections includes sub-surface of interior channel surface. At least region of sub-surface of each channel section includes distribution of raised micro-scale features. As another implementation, at least first region of interior channel surface includes distribution of raised micro-scale features interrupted by plurality of raised barriers spaced apart along channel path on interior channel surface. Each raised barrier extends on interior channel surface in directions partially transverse to and partially parallel to longitudinal axis. Method also provided.

20 Claims, 13 Drawing Sheets

DIRECTED-FLOW CONDUIT

BACKGROUND OF THE INVENTION

1. Field of the Invention

This invention generally relates to conduits for carrying a fluid from one location to another.

2. Related Art

This section introduces aspects that may help facilitate a better understanding of the invention. Accordingly, the statements of this section are to be read in that light and are not to be understood as admissions about what is prior art or what is not prior art.

Myriad types of conduits have been developed for carrying fluids from one location to another. Specialized conduits are available for moderating a pressure drop that is incurred by passing a fluid through a conduit. Despite these developments, there is a continuing need for improved conduits configured for enabling a fluid to be carried from one location to another.

SUMMARY

In an example of an implementation, a device is provided, including a first channel with a first channel input and a first channel output, the first channel having a first interior channel surface extending along a first channel path from the first channel input to the first channel output. The first channel includes a plurality of first channel sections in serial communication along the first channel path. Each of the first channel sections includes a first internal circumference spaced apart along the first channel path from a second internal circumference, in each of the first channel sections the first and second internal circumferences being substantially different. Each of the first channel sections includes a sub-surface of the first interior channel surface. At least a region of the sub-surface of each of the first channel sections includes a distribution of raised micro-scale features As another example of an implementation, a device is provided that includes a first channel with a first channel input and a first channel output, the first channel having a first interior channel surface extending around a longitudinal axis along a first channel path from the first channel input to the first channel output. At least a first region of the first interior channel surface includes a distribution of raised micro-scale features interrupted by a plurality of raised barriers spaced apart along the first channel path on the first interior channel surface. Each raised barrier extends on the first interior channel surface in directions that are partially transverse to the longitudinal axis and are partially parallel to the longitudinal axis.

In an additional example of an implementation, a process is provided. In the process, a fluid that includes a liquid and a vapor is passed through a first channel having a first channel input, a first channel output, and a first interior channel surface extending along a first channel path from the first channel input to the first channel output, at least a first region of the first interior channel surface including a distribution of raised micro-scale features. Further in the process, the first channel is configured for forcing the vapor to flow along a selected anisotropic pathway in the first channel. The process may, as examples, include passing such a fluid through one of the foregoing devices that are provided.

Other systems, processes, features and advantages of the invention will be or will become apparent to one with skill in the art upon examination of the following figures and detailed description. It is intended that all such additional systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Devices are provided that have a channel with a channel input and a channel output, the channel having an interior channel surface extending along a channel path from the channel input to the channel output. In an example of such a device, the channel may include a plurality of channel sections in serial communication along the channel path. Further, in such a device, each of the channel sections may include a first internal circumference spaced apart along the channel path from a second internal circumference, in each of the channel sections the first and second internal circumferences being substantially different. In addition, each of the channel sections may include a sub-surface of the interior channel surface, and at least a region of the sub-surface of each of the first channel sections may include a distribution of raised micro-scale features. In another example of such a device, at least a region of the interior channel surface may include a distribution of raised micro-scale features interrupted by a plurality of raised barriers spaced apart along the channel path on the interior channel surface, each raised barrier extending on the interior channel surface in directions that are partially transverse to a longitudinal axis of the device and are partially parallel to the longitudinal axis. The sub-surface of the interior channel surface may, for example, extend from the channel input to the channel output. In further examples, the channel, channel input, channel output, channel path, internal channel surface, and channel sections may be respectively referred to as the first channel, first channel input, first channel output, first channel path, first internal channel surface, and first channel sections. Devices may also, as examples, include one or more additional channels, channel inputs, channel outputs, channel paths, internal channel surfaces, or channel sections.

Figure 1:
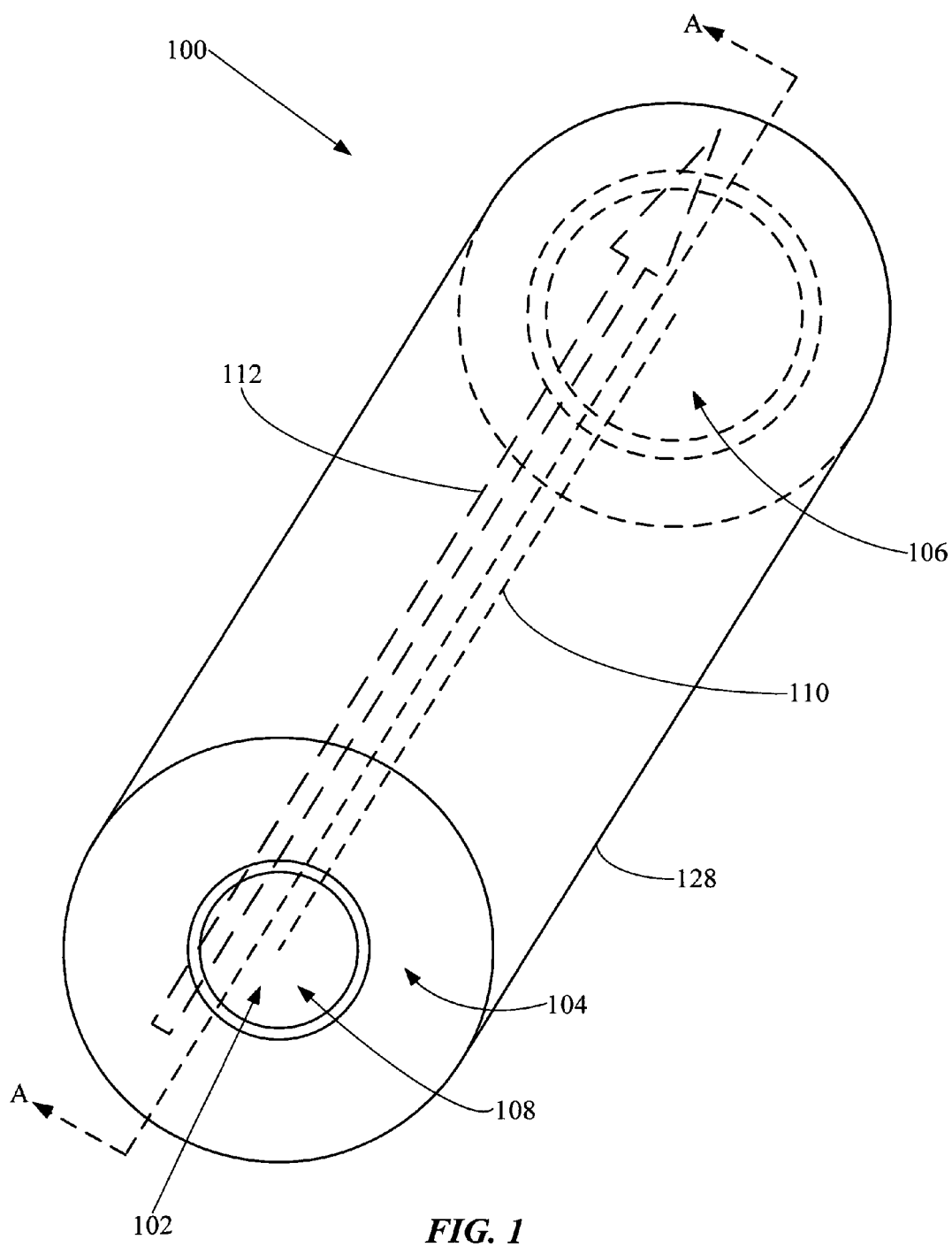
FIG. 1 is a perspective diagram showing an example of an implementation of a device.
Figure 2:
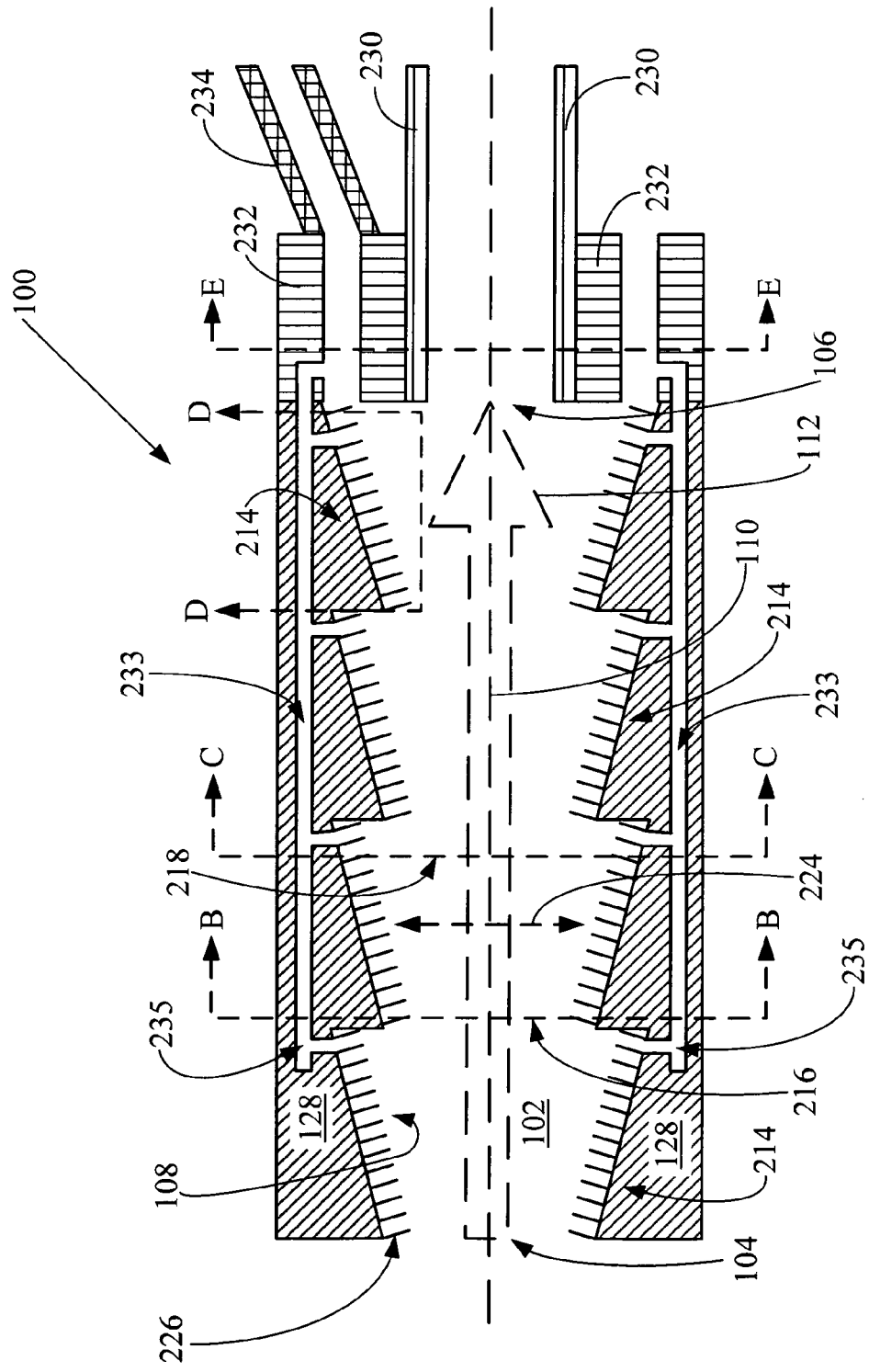
FIG. 2 is a cross-sectional diagram, taken on the line A-A, of the device shown in FIG. 1.

FIG. 1 is a perspective diagram showing an example of an implementation of a device 100. FIG. 2 is a cross-sectional diagram, taken on the line A-A, of the device 100 shown in FIG. 1. The device 100 includes a first channel 102 with a first channel input 104 and a first channel output 106. The first channel 102 has a first interior channel surface 108 extending along a first channel path 112 represented by an arrow, from the first channel input 104 to the first channel output 106. The first channel path 112 may extend along a longitudinal axis 110 represented by a dashed line. As shown in FIG. 2, the first channel 102 includes a plurality of first channel sections 214 in serial communication along the first channel path 112. Each of the first channel sections 214 of the device 100 includes a sub-surface 224 located as indicated by a dashed arrow and that is part of the first interior channel surface 108. The first interior channel surface 108 includes a distribution of raised micro-scale features 226. In examples, each of the first channel sections 214 may have a length along the first channel path 112, which lengths may be the same or different. The device 100 may include, for example, a housing 128.

Figure 3:
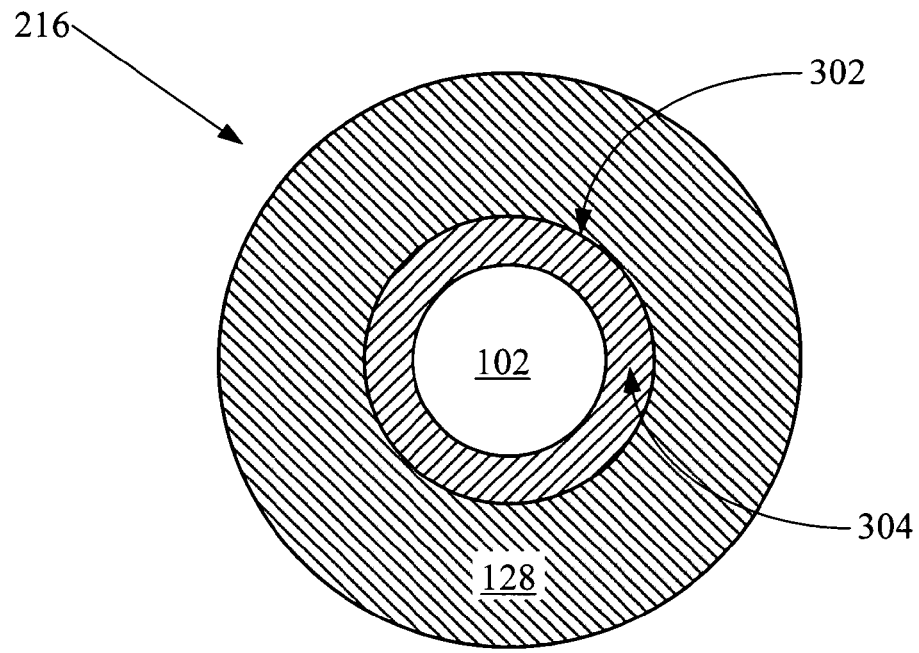
FIG. 3 is another cross-sectional diagram, taken on the line B-B, of the device as shown in FIG. 2.
Figure 4:
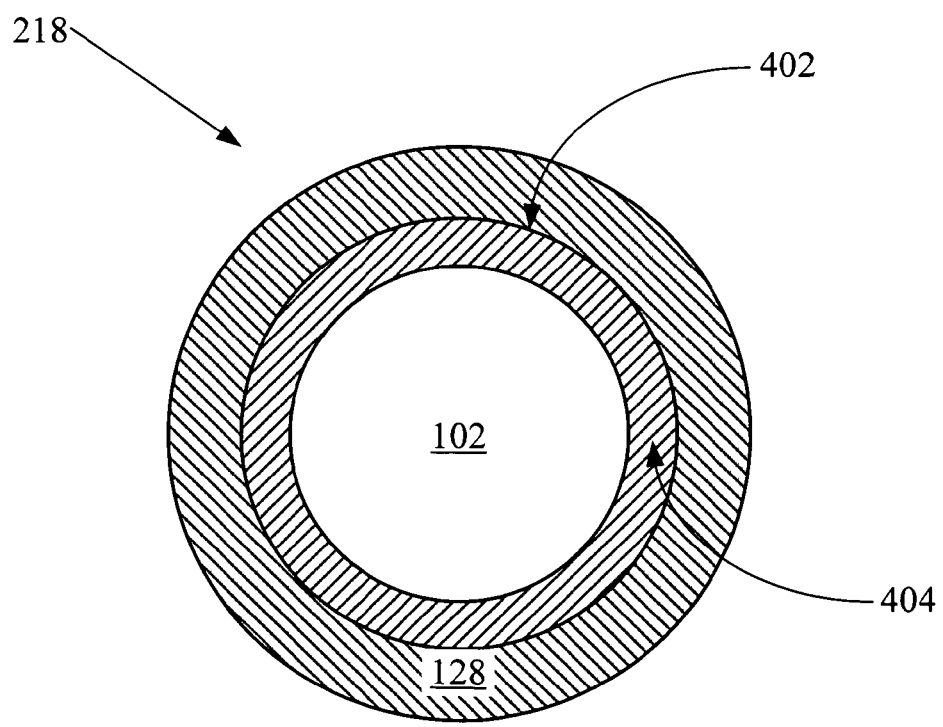
FIG. 4 is a further cross-sectional diagram, taken on the line C-C, of the device as shown in FIG. 2.

FIG. 3 is another cross-sectional diagram, taken on the line B-B, of the device 100 as shown in FIG. 2. FIG. 4 is a further cross-sectional diagram, taken on the line C-C, of the device 100 as shown in FIG. 2. In an example, each of the first channel sections 214 may, as shown in FIGS. 2-4, include a first internal circumference 302 spaced apart along the first channel path 112 from a second internal circumference 402, in each of the first channel sections 214 the first and second internal circumferences 302, 402 being substantially different.

Throughout this specification, it is understood that the term "substantially different" as used to compare two internal circumferences 302, 402 of a channel section such as the first and second circumferences 302, 402 of a channel section 214 of the first channel 102, means that either or both of the following conditions apply. One of the conditions is that the length of one of the first and second internal circumferences such as the first and second internal circumferences 302, 402 is at least about one percent (1%) longer than the other of the first and second internal circumferences 302, 402. The other condition is that the overall shapes of first and second internal circumferences such as the first and second internal circumferences 302, 402 are different. In an example, two or more channel sections in a device (not shown), such as channel sections 214, may meet either or both of these conditions in the same way. As another example, two or more channel sections in a device (not shown), such as channel sections 214, may meet either or both of these conditions in two or more different ways.

As examples, each of the first and second internal circumferences such as the first and second internal circumferences 302, 402 may have different overall shapes, selected from among the following example shapes: circle, ellipse, square, rectangular prism, triangle, pentagon, and other polygons. Vertices of such polygonal circumferences may be sharp or rounded, as examples. Further, as shown in FIG. 2 for example, each of the first channel sections 214 may include a progressively varying internal circumference along the first channel path 112. It is understood that these overall shapes for each of the first and second internal circumferences such as the first and second internal circumferences 302, 402 are merely examples and that other overall shapes may be utilized. As another example, the first internal circumference such as the first internal circumference 302 in each of the channel sections such as the first channel sections 214 may be defined as located at an input end such as the input end 216 of a channel section such as a first channel section 214 as shown in FIGS. 2 and 3. As a further example, the second internal circumference such as the second internal circumference 402 in each of the channel sections such as the first channel sections 214, may be defined as located at an output end such as the output end 218 of a channel section such as a first channel section 214 as shown in FIGS. 3 and 4. In each of the channel sections such as the first channel sections 214, the first internal circumference such as the first internal circumference 302 may be, as an example, smaller than the second internal circumference such as the second internal circumference 402. Further throughout this specification, it is understood that first and second internal circumferences such as the first and second internal circumferences 302, 402 may be located at any two different spaced apart points along a channel path such as the first channel path 112 within a channel section such as a first channel section 214.

As an example, the first channel 102 may have a maximum internal circumference selected so that the raised micro-scale features 126 may function in operation of the device 100 as further discussed below, and so that a maximized flow of a fluid (not shown) through the first channel 102 may be obtained. For example, a first channel 102 may have a maximum internal circumference of about ten centimeters (10 cm), or of about 5 cm, or of about 2 cm. It is understood that other maximum internal circumferences, including maximum internal circumferences substantially smaller than 2 cm, are also contemplated.

Figure 5:
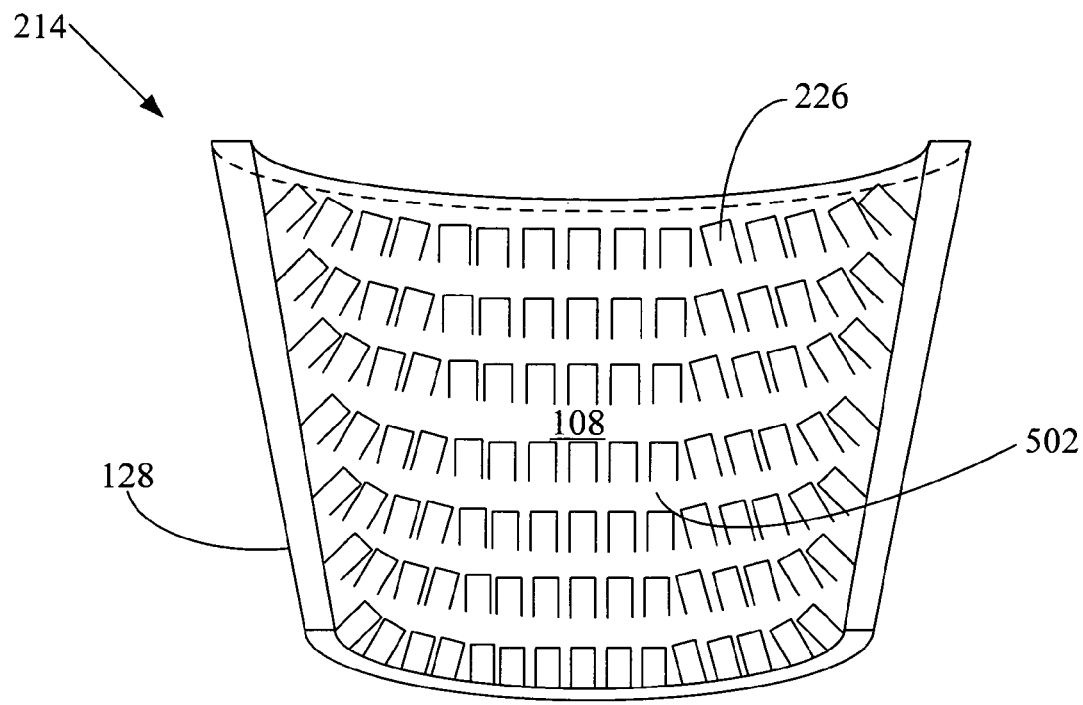
FIG. 5 is a cut-away diagram, taken on the line D-D, of part of an example of a portion of the device shown in FIG. 2.

FIG. 5 is a cut-away diagram, taken on the line D-D, of part of an example of a first channel section 214 of the device 100 shown in FIG. 2. As shown in FIG. 5, a region 502 of the sub-surface 224 of the example of a first channel section 214 includes a distribution of the raised micro-scale features 226. In another example, substantially the entire sub-surface 224 in each of the first channel sections 214 of the device 100, including as examples regions 304, 404 of the first interior channel surface 108, may include a distribution of raised micro-scale features 226. As a further example, a device 100 may include raised micro-scale features 226 on a part of the first interior channel surface 108 extending only partially around the first and second circumferences 302, 402, and there may be no raised micro-scale features 226 on the first interior channel surface 108 extending around another part of the first and second circumferences 302, 402. Further, for example, a device 100 may include distributions of raised micro-scale features 226 on the first interior channel surface 108 extending around different parts of the first and second circumferences 302, 402.

The raised micro-scale features 226 in the device 100 have an average diameter of less than about 1,000 micrometers (referred to throughout this specification as "micro-scale"). As an example, the raised micro-scale features 226 may have an average diameter within a range of between about two hundred (200) nanometers and about thirty (30) micrometers. Raised micro-scale features 226 having relatively small average diameters may generate relatively low resistance to flow of a fluid (not shown) over the raised micro-scale features 226. Hence, for example, the raised micro-scale features 226 may enhance the flow of a fluid (not shown) along the first channel path 112.

In an example, the raised micro-scale features 226 may have an average length of less than about ten (10) micrometers ("µm") on and extending away from the first interior channel surface 108. In a further example, the raised micro-scale features 226 may have an average length of between about 200 nanometers and about ten (10) µm on and extending away from the first interior channel surface 108. As another example, the raised micro-scale features 226 may have an average length of between about four (4) µm and about ten (10) µm, on and extending away from the first interior channel surface 108, with diameters of about 0.2 microns and aspect ratios of about 20:1. It is understood by those skilled in the art that these dimensional ranges for raised micro-scale features 226 are merely examples, and that other suitable dimensional ranges and sizes for raised micro-scale features 226 are contemplated and are included in the teachings of this disclosure.

The raised micro-scale features 226 may have any selected shape or shapes. As examples, such shapes may include, singly or in combination, posts, blades, spikes, pyramids, square rectangles, nails, and ridges. Suitable shapes are shown, as examples, in FIGS. 1A-E and 3A-C of Arney et al., U.S. Pat. No. 7,048,889 issued on May 23, 2006 and entitled "Dynamically Controllable Biological/Chemical Detectors Having Nanostructured Surfaces", the entirety of which is hereby incorporated herein by reference. Further suitable shapes of raised micro-scale features 226 are disclosed in Krupenkin et al., U.S. patent application Ser. No. 11/387,518, entitled "Super-Phobic Surface Structures", filed on Mar. 23, 2006, the entirety of which is hereby incorporated herein by reference. It is understood by those skilled in the art that these shapes for raised micro-scale features 226 are merely examples, and that other suitable shapes for raised micro-scale features 226 are contemplated and are included in the teachings of this disclosure.

The raised micro-scale features 226 are arranged in a distribution, which for example may include an array of the raised micro-scale features 226 arranged randomly or in a uniform, graduated or other pattern. As an example, the raised micro-scale features 226 may be arranged in a pattern on the first interior channel surface 108 so that an average spacing ("pitch") between nearest adjacent raised micro-scale features 226 is within a range of between about 1 micrometer and about 1 millimeter ("mm"). In another example, the raised micro-scale features 226 may be arranged in a pattern on the first interior channel surface 108 so that an average pitch between nearest adjacent raised micro-scale features 226 is within a range of between about 0.2 mm and about 0.6 mm. In a further example, the raised micro-scale features 226 may be randomly spaced apart, uniformly spaced apart, or spaced apart in a defined pattern or gradient on the first interior channel surface 108. The raised micro-scale features 226 may be selected, for example, to have dimensions and pitch suitable to form a superhydrophobic surface. The term "superhydrophobic" as used throughout this specification means that the subject superhydrophobic pattern of raised micro-scale features 226 is not immediately wetted by a liquid having a surface tension greater than about 70 dynes per centimeter ("dyn/cm"), and may not be immediately wetted by a liquid having a surface tension greater than about 28 dyn/cm. As an example, an alcohol having a surface tension of about 28 dyn/cm may not immediately wet a superhydrophobic pattern of raised micro-scale features 226. The raised micro-scale features 226 may, for example, have a hydrophobic coating (not shown) for increasing hydrophobicity of the raised micro-scale features 226 and which may facilitate forming such a superhydrophobic pattern of raised micro-scale features 226.

In operation, the device 100 may carry a fluid (not shown) including both liquid and vapor phase components from the first channel input 104 to the first channel output 106. For example, the device 100 may include a heat source (not shown) either integral with or separate from the device 100, for heating a fluid (not shown) to a temperature suitable for generating both liquid and vapor phases in such a fluid. The device 100 may, for example, constrain such a vapor phase component to flow in an anisotropic path suitable for generating a shearing force to drive the liquid phase through the first channel 102. A fluid to be carried through the device 100 may, for example, include water or ammonia, or a mixture including both. As further examples, a fluid to be carried through the device 100 may, for example, include a mixture of high-boiling molecules and low-boiling molecules. The low-boiling molecules may be selected, for example, as being in a vapor state at a selected fluid temperature for the device 100. The high-boiling molecules may be selected, for example, as being in a liquid state at a selected fluid temperature for the device 100. As another example, high- and low-boiling molecules may be selected that have a relatively low heat of mixing. Low-boiling, more-volatile fluids may include, as examples, ammonia and methyl formate, respectively having boiling points of about −33° C. and about 32° C. Relatively high-boiling, less-volatile fluids may include, as examples, dimethyl ketone and water, respectively having boiling points of about 56° C. and about 100° C.

The first interior channel surface 108 may, for example, be integral with the housing 128. As another example, the first interior channel surface 108 may be included in a lining base (not shown) on which the raised micro-scale features 226 may located. In that example, such a lining base (not shown) and the raised micro-scale features 226 may together be monolithic. Throughout this specification, the term "monolithic" means that the device elements so described, such as the raised micro-scale features 226 and such a lining (not shown), are a single, unitary body of the same material. As another example, the housing 128 and the raised micro-scale features 226 may be monolithic. In an additional example, the longitudinal axis 110 may include a curved region (not shown), and the first channel path 112 may generally follow the resulting curve. As examples, the curve (not shown) may be gradual or may include an abrupt bend. The longitudinal axis 110 may also include a straight region, or the entire longitudinal axis 110 may (not shown) be curved. In a device 100 having a housing 128, the housing 128 may have a generally cylindrical outer shape as shown in FIGS. 1, 3 and 4, so that the device 100 may have a cylindrical shape overall. As another example (not shown) a device 100 may include additional structural elements, such that the device 100 has another selected overall shape. In a further example (not shown) the device 100 may be integrated into another device having further components.

Figure 6:
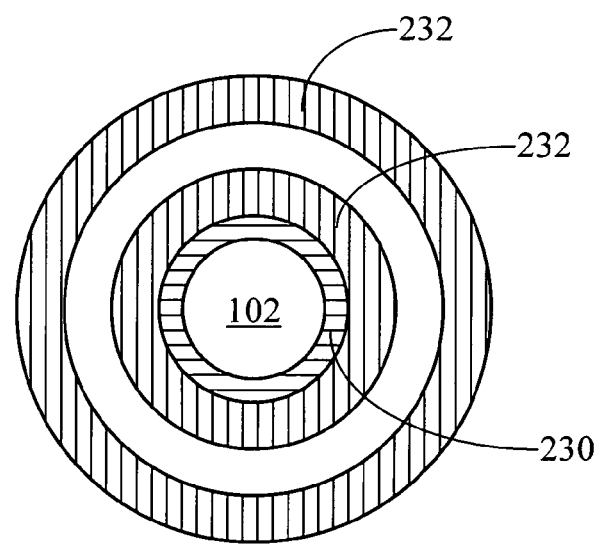
FIG. 6 is an additional cross-sectional diagram, taken on the line E-E, of the device shown in FIG. 2.

FIG. 6 is an additional cross-sectional diagram, taken on the line E-E, of the device 100 shown in FIG. 2. In an example, the device 100 may include first and second output conduits 230, 232 both in communication with the first channel output 106, and the device 100 may be configured to selectively direct a liquid (not shown) into the first output conduit 230 and to selectively direct a vapor into the second output conduit 232. In examples, the device 100 may include one or a plurality of internal conduits 233 in communication with the second output conduit 232 and with a plurality of orifices 235 spaced apart along a plurality of the channel sections 214. Vapor (not shown) may for example flow out of the first channel 102 through the orifices 235 and the internal conduit 233 to the second output conduit 232. The orifices 235 may, as an example, be located in the first interior channel surface 108 of each of the plurality of channel sections 214 at positions near a next serial channel section 214 in the direction of the channel path 112. Such positioning of the orifices 235 may, for example, direct flows of a vapor (not shown) generally in the direction of the channel path 112, generating shearing force in the same direction on a liquid (not shown) in the first channel 102. The second output conduit 232 may, for example, have an annular passage surrounding the first output conduit 230. In an example, the second output conduit 232 may be extended concentrically with the first output conduit 230, and together the first and second output conduits 230, 232 may respectively carry liquid and vapor to a destination (not shown). Further, for example, the second output conduit 232 may be tapped by a third output conduit 234 configured for carrying vapor to a destination different than a destination for liquid carried in the first output conduit 230.

As a further example of a device 100, the direction of the first channel path 112 in the first channel 102 may be reversed. In that example and referring to FIG. 2, the direction of the first channel path 112 may be reversed and the output conduits 230, 232 may be relocated adjacent to the first channel input 104, which then becomes a first channel output. In that example of a device 100 (not shown), each of the first channel sections 214 shown in FIGS. 2-4 may include an input end 218 having a first internal circumference 402 of the first channel 102, and an output end 216 having a second internal circumference 302 of the first channel 102. According to that example of a device 100, in each of the first channel sections 214 the first internal circumference 402 may be larger than the second internal circumference 302.

Figure 7:
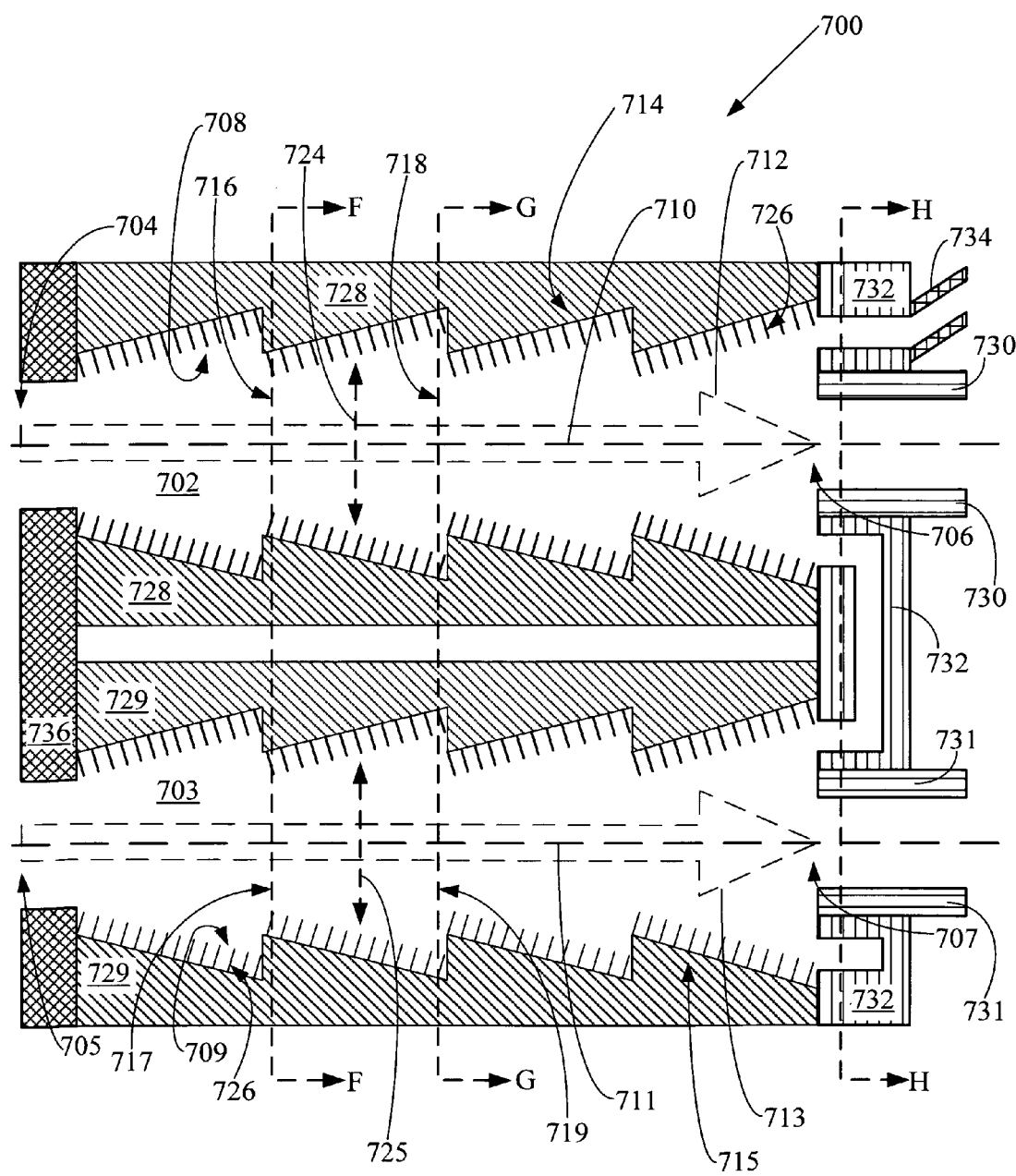
FIG. 7 is a cross-sectional diagram showing an example of an implementation of another device.

FIG. 7 is a cross-sectional diagram showing an example of an implementation of another device 700. The device 700 includes a first channel 702 and a second channel 703. Each of the first and second channels 702, 703 may, for example, have the same overall shape as discussed earlier with respect to the first channel 102 and shown in FIGS. 1-4. The first channel 702 has a first channel input 704 and a first channel output 706. The first channel 702 has a first interior channel surface 708 extending along a first channel path 712 represented by an arrow, from the first channel input 704 to the first channel output 706. The first channel path 712 may extend along a longitudinal axis 710 represented by a dashed line. The first channel 702 includes a plurality of first channel sections 714 in serial communication along the first channel path 712. In examples, each of the first channel sections 714 may have a length along the first channel path 712, which lengths may be the same or different. The second channel 703 has a second channel input 705 and a second channel output 707. The second channel 703 has a second interior channel surface 709 extending along a second channel path 713 represented by an arrow, from the second channel input 705 to the second channel output 707. The second channel path 713 may extend along a longitudinal axis 711 represented by a dashed line. The second channel 703 includes a plurality of second channel sections 715 in serial communication along the second channel path 713. In examples, each of the second channel sections 715 may have a length along the second channel path 713, which lengths may be the same or different. The first channel input 704 may be aligned together with the second channel input 705, and the first channel output 706 may be aligned together with the second channel output 707. For example, the first channel input 704 and the second channel input 705 may be located next to each other as shown in FIG. 7; and the first channel output 706 and the second channel output 707 may be located next to each other also as shown in FIG. 7.

Figure 8:
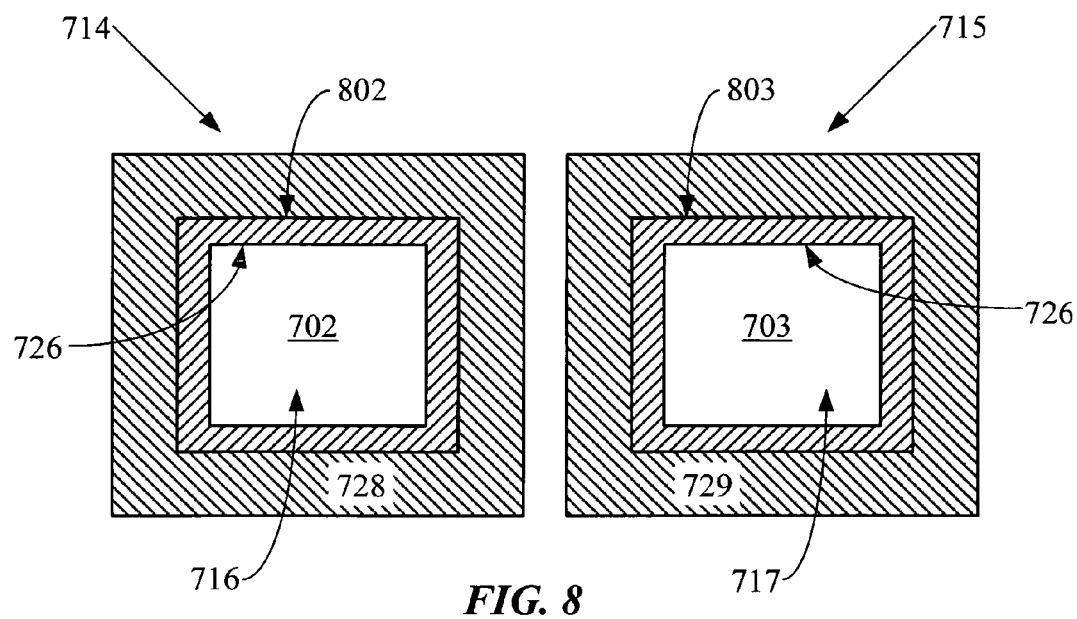
FIG. 8 is a cross-sectional diagram, taken on the line F-F, of the device shown in FIG. 7.
Figure 9:
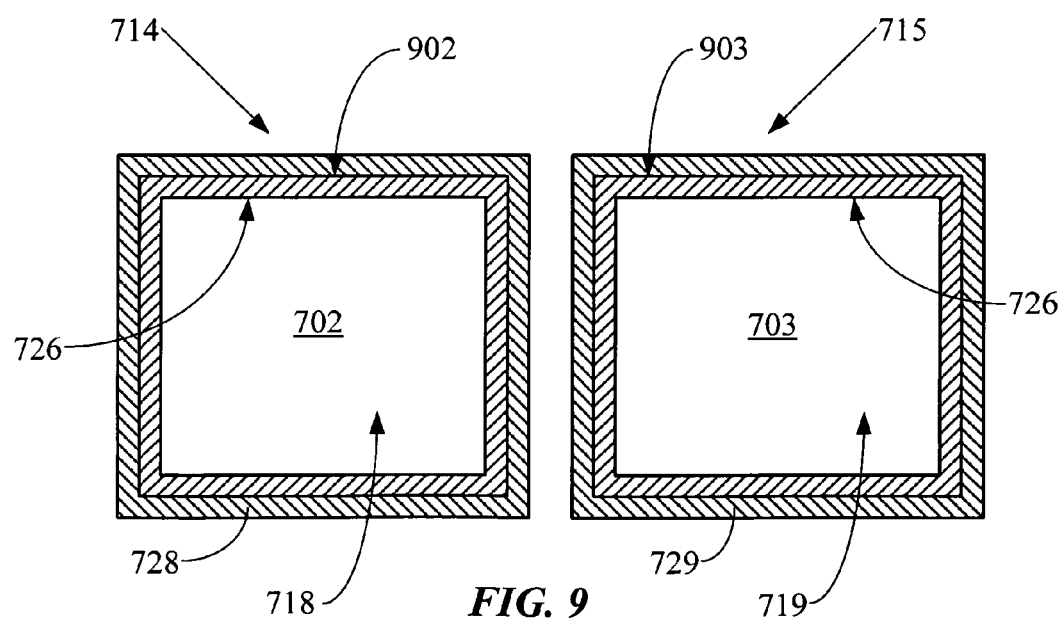
FIG. 9 is a further cross-sectional diagram, taken on the line G-G, of the device shown in FIG. 7.

FIG. 8 is a cross-sectional diagram, taken on the line F-F, of the device 700 shown in FIG. 7. FIG. 9 is a further cross-sectional diagram, taken on the line G-G, of the device 700 shown in FIG. 7. Each of FIGS. 8-9 shows the first and second channels 702, 703 also shown in FIG. 7.

In an example, each of the first channel sections 714 may, as shown in FIGS. 7-9, include a first internal circumference 802 spaced apart along the first channel path 712 from a second internal circumference 902, in each of the first channel sections 714 the first and second internal circumferences 802, 902 being substantially different. Further, for example, each of the second channel sections 715 may, as shown in FIGS. 7-9, include a first internal circumference 803 spaced apart along the second channel path 713 from a second internal circumference 903, in each of the second channel sections 715 the first and second internal circumferences 803, 903 being substantially different.

As another example, the first internal circumference 802 in each of the first channel sections 714 may be defined as located at an input end 716 of a first channel section 714 as shown in FIGS. 7-9. As a further example, the second internal circumference 902 in each of the first channel sections 714 may be defined as located at the output end 718 of a first channel section 714 as shown in FIGS. 7-9. Further, for example, the first internal circumference 803 in each of the second channel sections 715 may be defined as located at an input end 717 of a second channel section 715 as shown in FIGS. 7-9. As a further example, the second internal circumference 903 in each of the second channel sections 715 may be defined as located at an output end 719 of a second channel section 715 as shown in FIGS. 7-9.

Further, as shown in FIG. 7 for example, each of the first and second channel sections 714, 715 may include a progressively varying internal circumference along the first and second channel paths 712, 713. It is understood that the first and second circumferences 802, 803, 902, 903 may be modified in the same ways as discussed above with respect to the first and second circumferences 302, 402, which discussion is deemed incorporated here.

In an example, each of the first and second internal circumferences 802, 803, 902, 903 may have a generally rectangular shape as shown in FIGS. 8-9. In further examples (not shown), each of the first and second internal circumferences 802, 803, 902, 903 may have generally circular shapes as discussed earlier with respect to the first and second internal circumferences 302, 402 of the device 100 and as shown in FIGS. 3-4, or other shapes which may be the same or different. Each of the first channel sections 714 of the device 700 includes a sub-surface 724 located as indicated by a dashed arrow, of the first interior channel surface 708. Each of the second channel sections 715 of the device 700 includes a sub-surface 725 indicated by a dashed arrow, of the second interior channel surface 709. Regions (not shown) of the sub-surfaces 724, 725 each include a distribution of raised micro-scale features 726. In another example, substantially the entire sub-surfaces 724, 725 of the first and second interior channel surfaces 708, 709 in each of the first and second channel sections 714, 715 of the device 700 may include raised micro-scale features 726. As a further example, a device 700 may include raised micro-scale features 726 on parts of the first and second interior channel surfaces 708, 709 extending only partially around the first and second circumferences 802, 803, 902, 903 in the same manner as discussed above with respect to the device 100. The raised micro-scale features 726 in the device 700 may have dimensions, pitch, pattern, and selected shapes analogous to those discussed earlier with regard to the raised micro-scale features 226; and may likewise be superhydrophobic.

In an example, the first and second interior channel surfaces 708, 709 may respectively be integral with housings 728, 729. Alternatively, for example (not shown), the first and second interior channel surfaces 708, 709 may together be integral with a unitary housing. As another example, each of the first and second interior channel surfaces 708, 709 may be included in a lining base (not shown) on which the raised micro-scale features 726 may be located. In that example, such a lining base (not shown) and the raised micro-scale features 726 may be monolithic. As another example, the housings 728, 729 and the raised micro-scale features 726 may be monolithic. In an additional example, each of the longitudinal axes 710, 711 may include a curved region (not shown), and the first and second channel paths 712, 713 may generally follow the resulting curve. As examples, the curves (not shown) may be gradual or may include one or more abrupt bends. Each of the longitudinal axes 710, 711 may also include a straight region, or the entire longitudinal axes 710, 711 may (not shown) be curved. The device 700 may include housings 728, 729 each having a generally rectangular outer shape transverse to the longitudinal axes 710, 711 as shown in FIGS. 8-9. As another example (not shown) a device 700 may include additional structural elements, such that the housings 728, 729 of the device 700 each have another selected outer shape, or different shapes. In a further example (not shown) the device 700 may be integrated into another device having further components.

Figure 10:
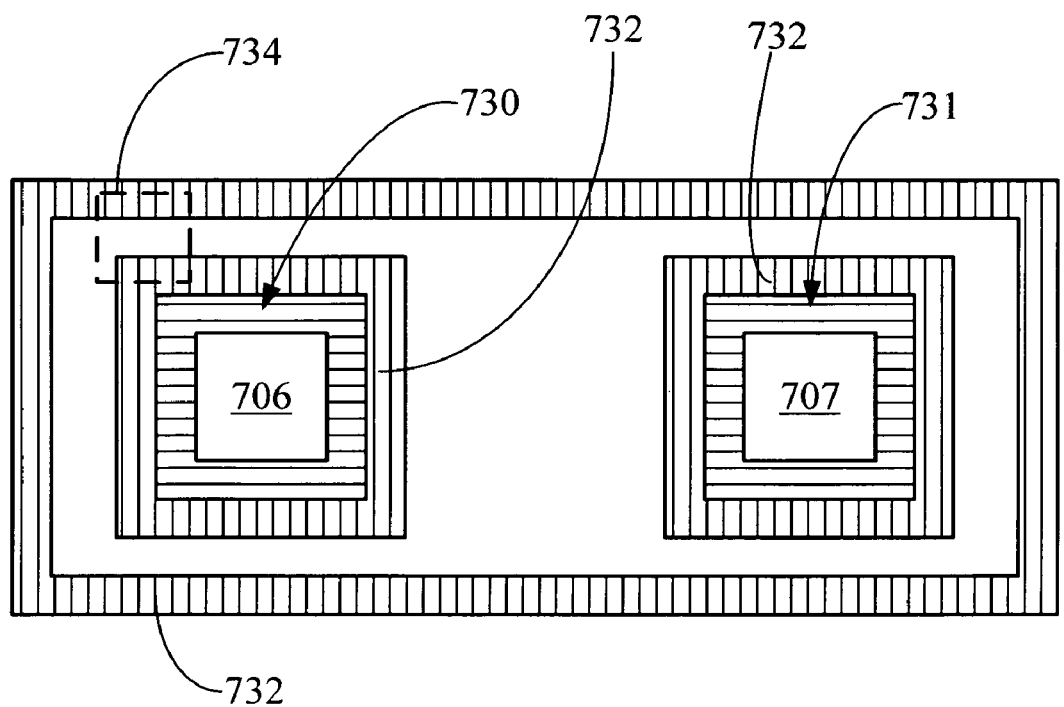
FIG. 10 is an additional cross-sectional diagram, taken on the line H-H, of the device shown in FIG. 7.

FIG. 10 is an additional cross-sectional diagram, taken on the line H-H, of the device 700 shown in FIG. 7. In an example, the device 700 may include output conduits 730, 731 respectively in communication with the first and second channel outputs 706, 707. Further, for example, the device 700 may include an output manifold 732 also in communication with the first and second channel outputs 706, 707. The device 700 may be configured, as an example, to selectively direct a liquid (not shown) into the output conduits 730, 731. The device 700 may further be configured, as an example, to selectively direct a vapor into the output manifold 732. In additional examples, each of the first and second channels 702, 703 may include an internal conduit (not shown) in communication with the output manifold 732 and with a plurality of orifices (not shown) spaced apart along a plurality of the channel sections 714, 715 in the same manner as discussed with respect to the internal conduit 233 and orifices 235 in the device 100. In an example, the output manifold 732 may be tapped by an output conduit 734. The device 700 may additionally have an input manifold 736 including the first and second channel inputs 704, 705. Further, for example, the device 700 may have an additional output manifold (not shown) connecting together the output conduits 730, 731.

As a further example of a device 700 (not shown), the directions of the first and second channel paths 712, 713 respectively in the first, and second channels 702, 703 may be reversed. In that example and referring to FIG. 7, the output conduits 730, 731 may be relocated adjacent to the first and second channel inputs 704, 705, respectively. Further, the locations of the manifolds 732, 736 may be exchanged. In that example of a device 700 (not shown), each of the first channel sections 714 shown in FIGS. 7-9 may then include an input end 718 having a first internal circumference 902 of the first channel 702, and an output end 716 having a second internal circumference 802 of the first channel 702. In each of the first channel sections 714, the first internal circumference 902 may be, for example, larger than the second internal circumference 802. The second channel sections 715 may be changed in a manner analogous to these changes in the first channel sections 714.

In another example (not shown), a device 700 may include more than two channels such as the channels 702, 703 shown in FIGS. 7-10 and discussed above. Such a device 700 may include, for example, tens, hundreds, thousands, or more channels such as the channels 702, 703. Such channels (not shown) may, for example, be aligned together and may have manifolds in various configurations analogous to those shown in FIGS. 7-10 and discussed above.

Figure 11:
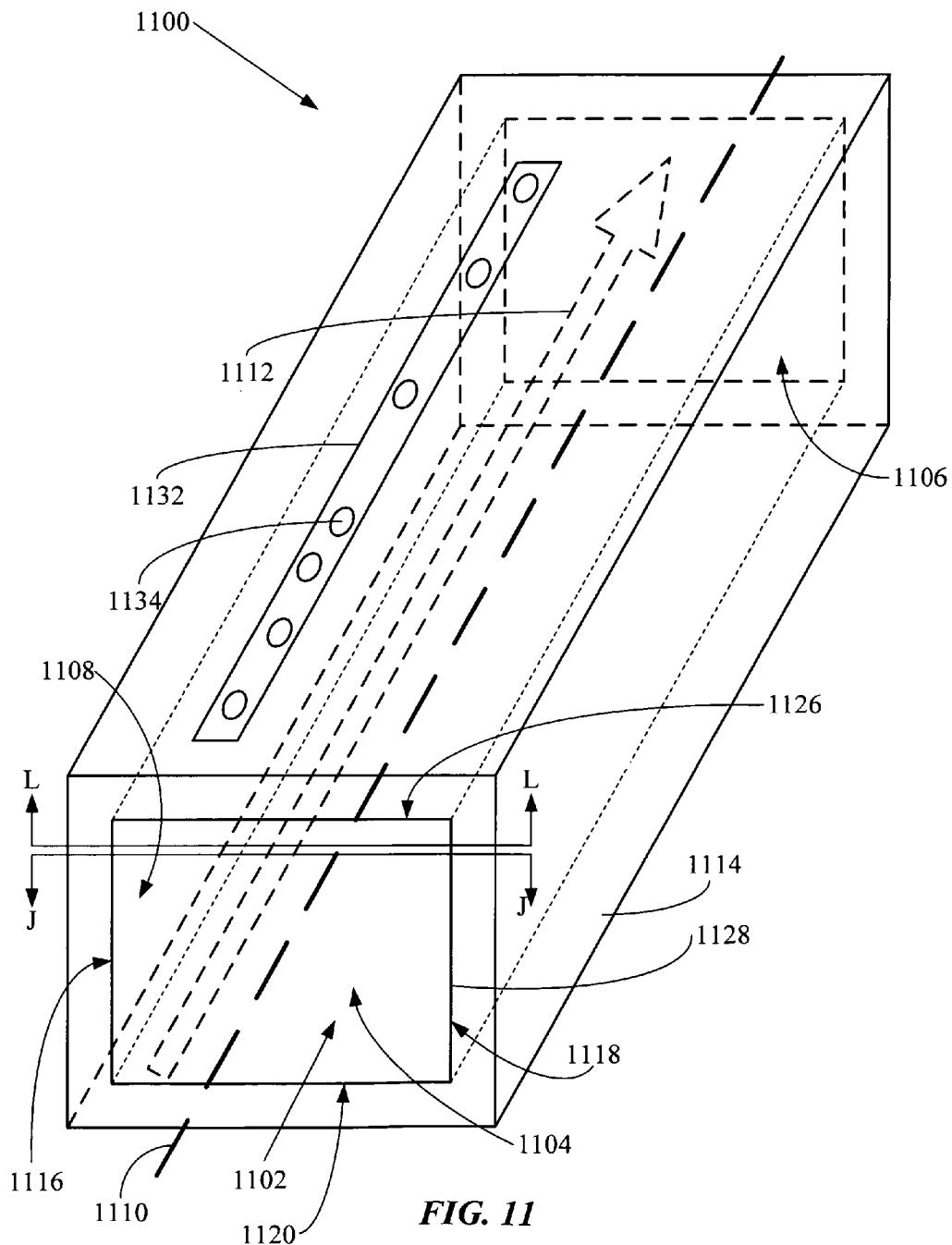
FIG. 11 is a perspective diagram showing an example of an implementation of an additional device.

FIG. 11 is a perspective diagram showing an example of an implementation of an additional device 1100. The device 1100 includes a first channel 1102 with a first channel input 1104 and a first channel output 1106, the first channel 1102 having a first interior channel surface 1108 extending along a longitudinal axis 1110 represented by a dashed line, in a first channel path 1112 represented by an arrow, from the first channel input 1104 to the first channel output 1106. In an example, the device 1100 may include a housing 1114 integrated with the first channel input 1104 and with the first channel output 1106, and surrounding the first channel 1102. Further, the first interior channel surface 1108 may include side walls 1116, 1118, a bottom wall 1120, and a top wall 1126. The device 1100 may have an internal circumference 1128 around the longitudinal axis 1110 and along the first channel path 1112.

Figure 12:
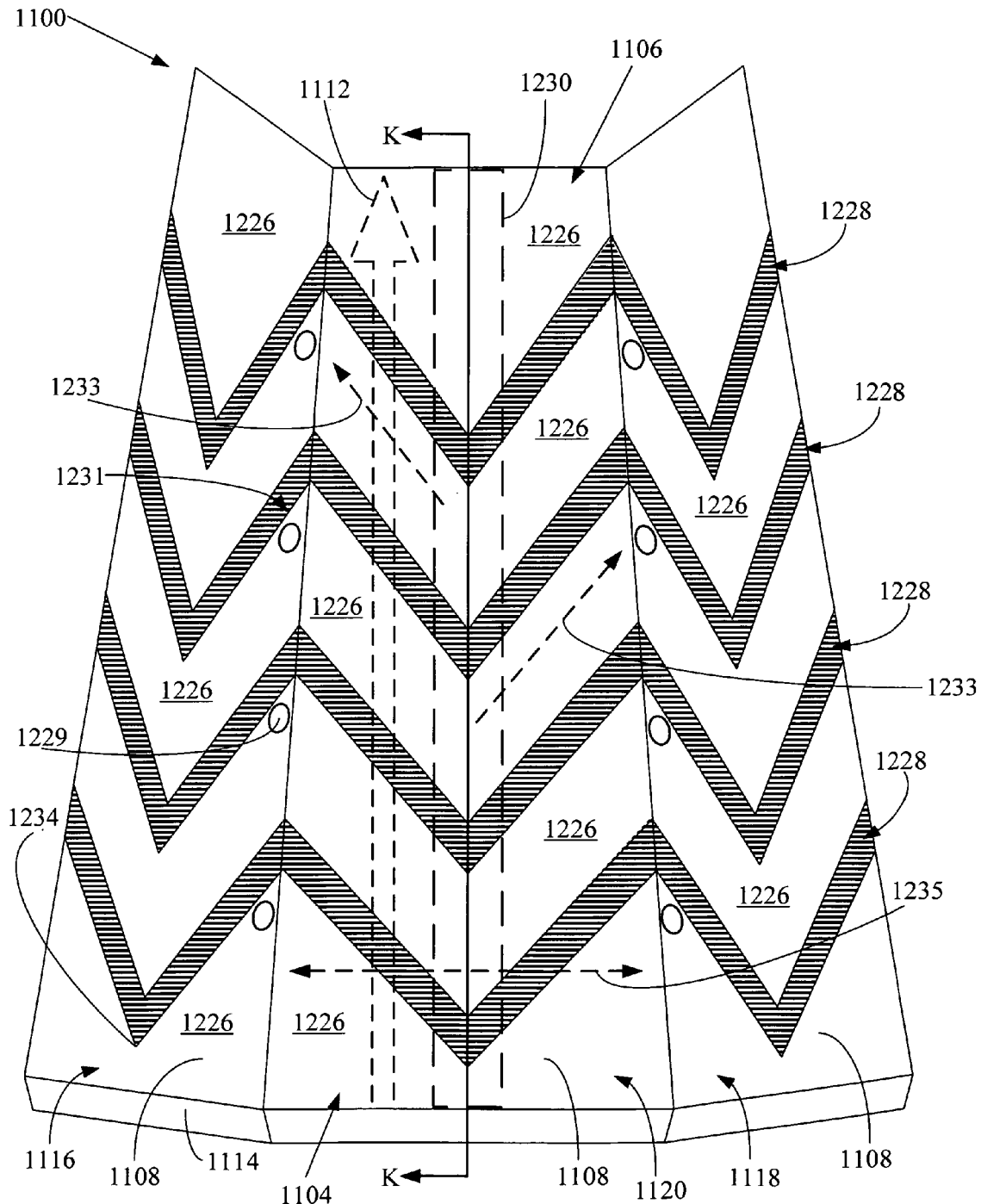
FIG. 12 is a cut-away diagram, taken along the line J-J, of the device shown in FIG. 11.

FIG. 12 is a cut-away diagram, taken along the line J-J, of the device 1100 shown in FIG. 11. In FIG. 12, side walls 1116, 1118 of the first interior channel surface 1108 have been unfolded away from bottom wall 1120. As an example, the bottom wall 1120 of the first interior channel surface 1108 may have raised micro-scale features 1226 interrupted by a plurality of raised barriers 1228 spaced apart along the first channel path 1112 on the first interior channel surface 1108. The raised micro-scale features 1226 may for example extend on the bottom wall 1120 from the first channel input 1104 to the first channel output 1106. The raised micro-scale features 1226 may have dimensions, pitch, pattern, and selected shapes analogous to those discussed earlier with regard to the raised micro-scale features 226; and may likewise be superhydrophobic. Each of the raised barriers 1228 extends on the first interior channel surface 1108 in directions that are partially transverse to the longitudinal axis 1110 and are partially parallel to the longitudinal axis 1110. As examples, portions of a raised barrier 1228 may be aligned parallel to, transverse to, or at another angle to the longitudinal axis 1110. In an example, the raised barriers 1228 may force a vapor (not shown) to flow through the device 1100 in a selected anisotropic pathway in the first channel 1102, near the first interior channel surface 1108. Throughout this specification, the term "selected anisotropic pathway" means a pathway of a vapor through a channel, where the channel has a structure configured such that at least a portion of such a vapor is deflected away from a direct path for a liquid through the channel. In operation, the device 1100 may carry a fluid (not shown) including both liquid and vapor phase components from the first channel input 1102 along the first channel path 1112 to the first channel output 1106. The device 1100 may, for example, constrain such a vapor phase component to flow in an anisotropic path suitable for generating a shearing force to drive the liquid phase through the first channel 1102. For example, the device 1100 may include a heat source (not shown) either integral with or separate from the device 1100, for heating a fluid (not shown) to a temperature suitable for generating both liquid and vapor phases in such a fluid.

As an example, the raised barriers 1228 may be arranged in a herringbone pattern on the first interior channel surface 1108, as shown in FIG. 12. A "herringbone" pattern may include, for example, adjoining vertical rows of slanting lines where any two contiguous lines form either a "V" or an inverted "V"; also referred to as a "chevron". In FIG. 12, for example, the raised barriers 1228 as shown are arranged on the bottom and side walls 1116, 1118, 1120 in a series of "V's" where a point 1234 of each "V" is generally oriented upstream away from the first channel path 1112. Further, for example, either or both of the side walls 1116, 1118 may have orifices 1229 for removal of a vapor (not shown) from the first channel 1102. The orifices 1229 may be located, as an example, near the bottom wall 1120, or at other locations in the side walls 1116, 1118. As another example, the orifices 1229 may be located or clustered toward upstream edges 1231 of the raised barriers 1228 along the first channel path 1112. Such location or clustering of the orifices 1229 with respect to the raised barriers 1228 may contribute to a flow of a vapor (not shown) near the first interior channel surface 1108. As an example, some of the vapor (not shown) may flow generally in directions of arrows 1233. The orifices 1229 may have uniform or varying sizes and shapes. As examples, the orifices 1229 may have shapes that are round, elliptical, rectangular, honeycomb, or polygonal. The orifices 1229 may also be, for example, pores, channels or longitudinal gaps extending along part or all of the first channel path 1112, suitably sized and oriented for conducting a vapor (not shown) out of the first channel 1102. As further examples (not shown) orifices 1229 may likewise or alternatively be located in either or both of the bottom and top walls 1120, 1126.

In addition, for example, the side walls 1116, 1118 of the first interior channel surface 1108 may also have raised micro-scale features 1226 interrupted by a plurality of raised barriers 1228 spaced apart along the first channel path 1112 on the first interior channel surface 1108. The raised micro-scale features 1226 may for example extend on the side walls 1116, 1118 from the first channel input 1104 to the first channel output 1106. In this additional example, each of the raised barriers 1228 on the side walls 1116, 1118 extends on the first interior channel surface 1108 in directions that are partially transverse to the longitudinal axis 1110 and are partially parallel to the longitudinal axis 1110. As an example, the raised barriers 1228 on the side walls 1116, 1118 may be arranged in a herringbone pattern on the first interior channel surface 1108, as shown in FIG. 12. In a further example, the raised barriers 1228 on the bottom wall 1120 may be connected with the raised barriers 1228 on the side walls 1116, 1118. For example, raised barriers 1228 on the side walls 1116, 1118 and on the bottom wall 1120 may be arranged in connected herringbone patterns collectively having zig-zag paths as shown in FIG. 12. As another example (not shown), the top wall 1126 of the first interior channel surface 1108 may likewise have raised micro-scale features 1226 interrupted by a plurality of raised barriers 1228 spaced apart along the first channel path 1112 on the first interior channel surface 1108.

In a further example, the raised barriers 1228 on the top, bottom and side walls 1116, 1118, 1120, 1126 may be connected together forming continuous barriers (not shown) completely encircling the internal circumference 1128 of the device 1100. In an example, such continuous barriers collectively formed by raised barriers 1228 connected around the internal circumference 1128 may force a vapor (not shown) to flow through the device 1100 in a more highly anisotropic pathway near the first interior channel surface 1108. Vapor flow in such a more highly anisotropic path in the device 1100 and out through the orifices 1229 may, for example, further reduce a pressure drop in the first channel 1102 along the first channel path 1112. In an example, raised barriers 1228 on the top, bottom and side walls 1116, 1118, 1120, 1126 may be arranged in connected herringbone patterns collectively having zig-zag paths.

In an example, a device 1100 may at least have a first region 1230 represented by a dashed rectangle and that is part of the first interior channel surface 1108, that includes raised micro-scale features 1226 interrupted by a plurality of the raised barriers 1228 spaced apart along the first channel path 1112. The first region 1230 of the first interior channel surface 1108 may, as an example, extend from the first channel input 1104 to the first channel output 1106. It is understood that such a first region 1230 of the first interior channel surface 1108 may be located on any one or more of the top, bottom and side walls 1116, 1118, 1120, 1126. In another example, such a first region 1230 of the first interior channel surface 1108 may be located on the bottom wall 1120, and the first interior channel surface 1108 may also have a second region 1132 represented by a rectangular line and shown in FIG. 11, located in the top wall 1126 and including a plurality of orifices 1134 in the first interior channel surface 1108. The second region 1132 of the first interior channel surface 1108 may, for example, extend from the first channel input 1104 to the first channel output 1106. As another example (not shown) the first region 1230 may be located on the bottom wall 1120, and the second region 1132 may be located in either or both of the side walls 1116, 1118, and may also be located in the top wall 1126. In a further example, the first region 1230 may be oriented on the internal circumference 1128 of the device 1100 below the second region 1132. In another example, the orifices 1134 may pass through the housing 1114. The device 1100 may be configured, for example, to selectively direct a liquid through the first channel 1102 (not shown) to the first channel output 1106, and to selectively direct a vapor (not shown) out of the first channel 1102 along the first channel path 1112 through the orifices 1134, 1229. As an example, the orifices 1134, 1229 may communicate with a conduit (not shown) either within or outside the device 1100 configured for vapor collection and direction to a destination (not shown). Further, for example, such a conduit (not shown) may be integral with a housing 1114 of the device 1100.

In further examples (not shown), the plurality of raised barriers 1228 shown on the bottom surface 1120 of the device 1100 in FIG. 12 may be considered as collectively constituting a first longitudinal row of raised barriers 1228. FIG. 12 hence illustrates an example of a bottom wall 1120 having a longitudinal row including four "V"-shaped raised barriers 1228. Likewise, the pluralities of raised barriers 1228 shown on the side walls 1116, 1118 of the device 1100 as shown in FIG. 12 may respectively be considered as collectively constituting second and third longitudinal rows of raised barriers 1228. Still describing these further examples (not shown), a device 1100 may have a bottom wall 1120 including all of the first, second and third longitudinal rows of raised barriers 1228, the three longitudinal rows being positioned next to each other side-by-side in directions 1235 represented by an arrow, analogous to modifying the device 1100 shown in FIG. 12 by fully flattening the side walls 1116 and 1118 and merging together the walls 1116, 1120, 1118 to form a bottom wall of such a device. Furthermore, the three longitudinal rows of raised barriers 1228 on the bottom wall of such a device 1100 may, for example, be mutually aligned in the direction of the first channel path 1112 so that contiguous raised barriers 1228 in adjacent longitudinal rows join together to form a continuous zig-zag in the same manner as contiguous raised barriers 1228 form such zig-zags successively on the walls 1116, 1120, 1118 shown in FIG. 12. In other examples (not shown), the three longitudinal rows of raised barriers 1228 on the bottom wall of such a device 1100 may, for example, be mutually staggered along the direction of the first channel path 1112 so that one or more raised barriers 1228 in a longitudinal row may not form a continuous zig-zag with any raised barrier 1228 in an adjacent longitudinal row. It is understood that a device 1100 having a longitudinal row of "V"-shaped raised barriers 1228 as described in these examples may include any selected quantity of "V"-shaped raised barriers 1228 in the longitudinal row. It is further understood that a device 1100 having a plurality of longitudinal rows of "V"-shaped raised barriers 1228 as described in these examples may include any selected quantity of such longitudinal rows on the bottom wall 1120. In still further examples (not shown), a device 1100 may have a bottom wall 1120 including a random or partially random distribution of "V"-shaped raised barriers 1228, where some or all of the "V"-shaped raised barriers 1228 may not be included in longitudinal rows or may not form a contiguous zig-zag. It is further understood that all of the foregoing examples discussed in this paragraph with respect to variations in locations of raised barriers 1228 on the bottom wall 1120 of the device 1100 may further be extended to analogous modifications of any combinations of two or more of the walls 1116, 1118, 1120, 1126.

Figure 13:
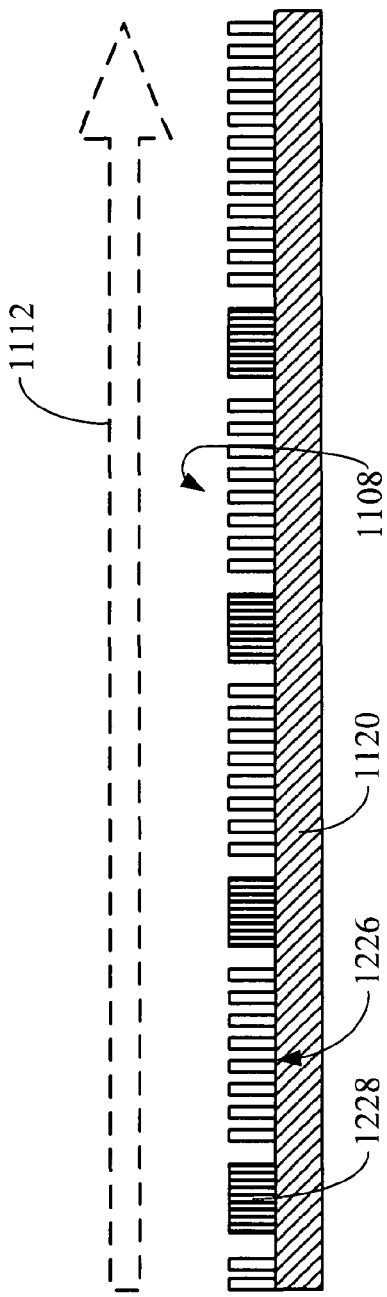
FIG. 13 is a cross-sectional diagram, taken along the line K-K, of the device shown in FIG. 12.

FIG. 13 is a cross-sectional diagram, taken along the line K-K, of the device 1100 shown in FIG. 12. As earlier discussed, the bottom wall 1120 may for example include a distribution of raised micro-scale features 1226 interrupted by a plurality of raised barriers 1228 spaced apart along the first channel path 1112 on the first interior channel surface 1108.

Figure 15:
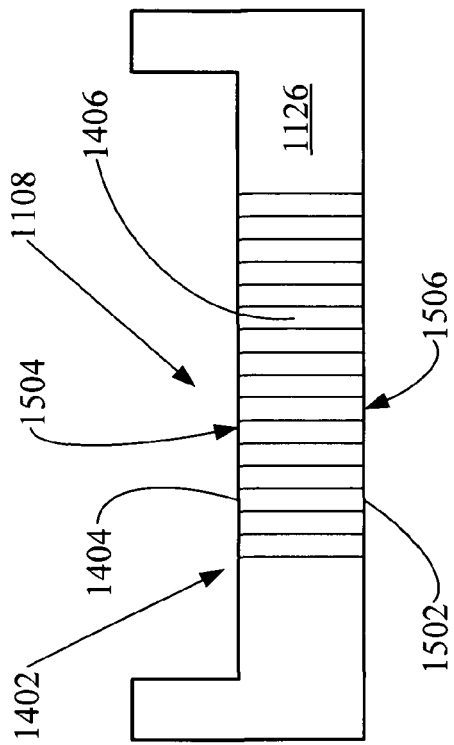
FIG. 15 is a cross-sectional diagram, taken along the line M-M, of the device shown in FIG. 14.
Figure 14:
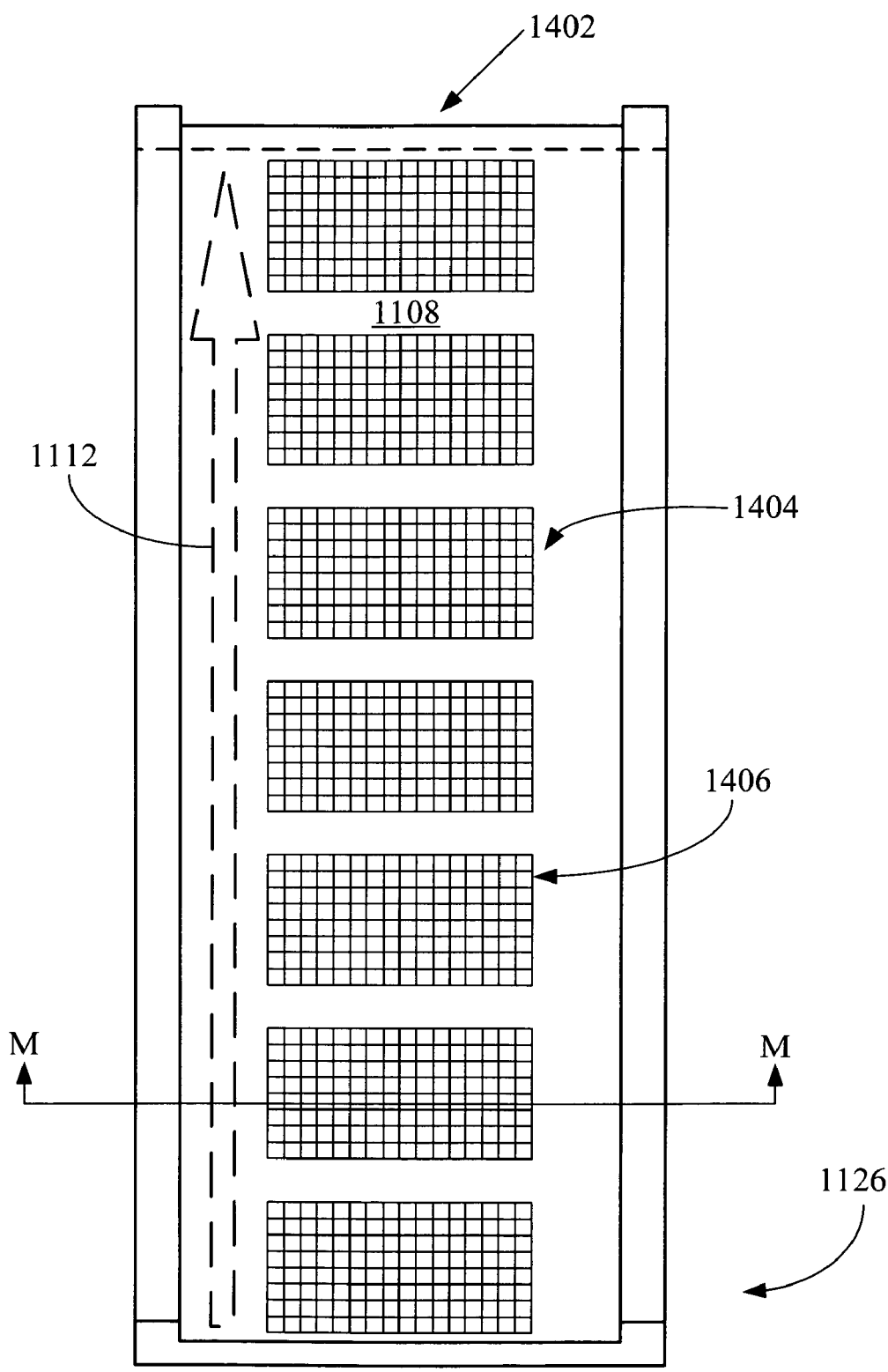
FIG. 14 is a cut-away diagram, taken along the line L-L, of the device shown in FIG. 11.

FIG. 14 is a cut-away diagram, taken along the line L-L, of the device 1100 shown in FIG. 11. FIG. 15 is a cross-sectional diagram, taken along the line M-M, of the device 1100 shown in FIG. 14. As an example, the top wall 1126 of the device 1100 may include a membrane 1402. In further examples, one or more of the side and bottom walls 1116, 1118, 1120 may also or alternatively include a membrane (not shown); and a membrane (not shown) may additionally be partially included in two or more of the walls 1116, 1118, 1120, 1126. The membrane 1402 may have an inner membrane surface 1404 forming a sub-surface that is part of the first interior channel surface 1108, an outer membrane surface 1502, and a plurality of orifices 1406. The orifices 1406 may, for example, have inner orifice ends 1504 at the first interior channel surface 1108 and outer orifice ends 1506 at the outer membrane surface 1502.

It is understood throughout this specification by those skilled in the art that the term "below" as applied to a first part of a device such as the device 1100 designates that the first part is shown as being closer to a bottom of the drawing figure than a second part of the device "above" the first part, both of the first and second parts being as shown in a figure such as FIG. 15. It is understood that such "below" and "above" designations refer to examples of relative orientations of such parts of the device as they are shown in the figures. For example, the "above" and "below" orientations of parts of a device such as the device 1100 may be reversed. Referring to FIG. 11, the top wall 1126 is shown "above" the bottom wall 1120 "below". If FIG. 11 were to be inverted, as an example, then the bottom wall 1120 would be "above" the top wall "1126" below.

The membrane 1402 may, for example, be substituted for the orifices 1134 earlier discussed with respect to FIG. 11. As another example, the membrane 1402 may be included in the second region 1132 of the first interior channel surface 1108 as discussed earlier in relation to the first region 1230. As another example, the orifices 1406 may be located or clustered near the upstream edges 1231 of the raised barriers 1228 along the first channel path 1112. Such location or clustering of the orifices 1406 with respect to the raised barriers 1228 may contribute to a flow of a vapor (not shown) near the first interior channel surface 1108. For example, some of the vapor (not shown) may flow generally in the directions of arrows 1233. The device 1100 may be configured, for example, to selectively direct a liquid through the first channel 1102 (not shown) to the first channel output 1106, and to selectively direct a vapor (not shown) out of the first channel 1102 through the orifices 1229, 1406. As an example, the orifices 1229, 1406 may communicate with a conduit (not shown) either within or outside the device 1100 configured for vapor collection and direction to a destination (not shown). Further, for example, such a conduit (not shown) may be integral with a housing 1114 of the device 1100. The membrane 1402 may further, for example, have the structure of a membrane as disclosed in the commonly-owned and simultaneously-filed Basavanhally et al., U.S. patent application entitled "Thermal Energy Transfer Device", 12/080,408, the entirety of which hereby is incorporated herein by reference.

Figure 16:
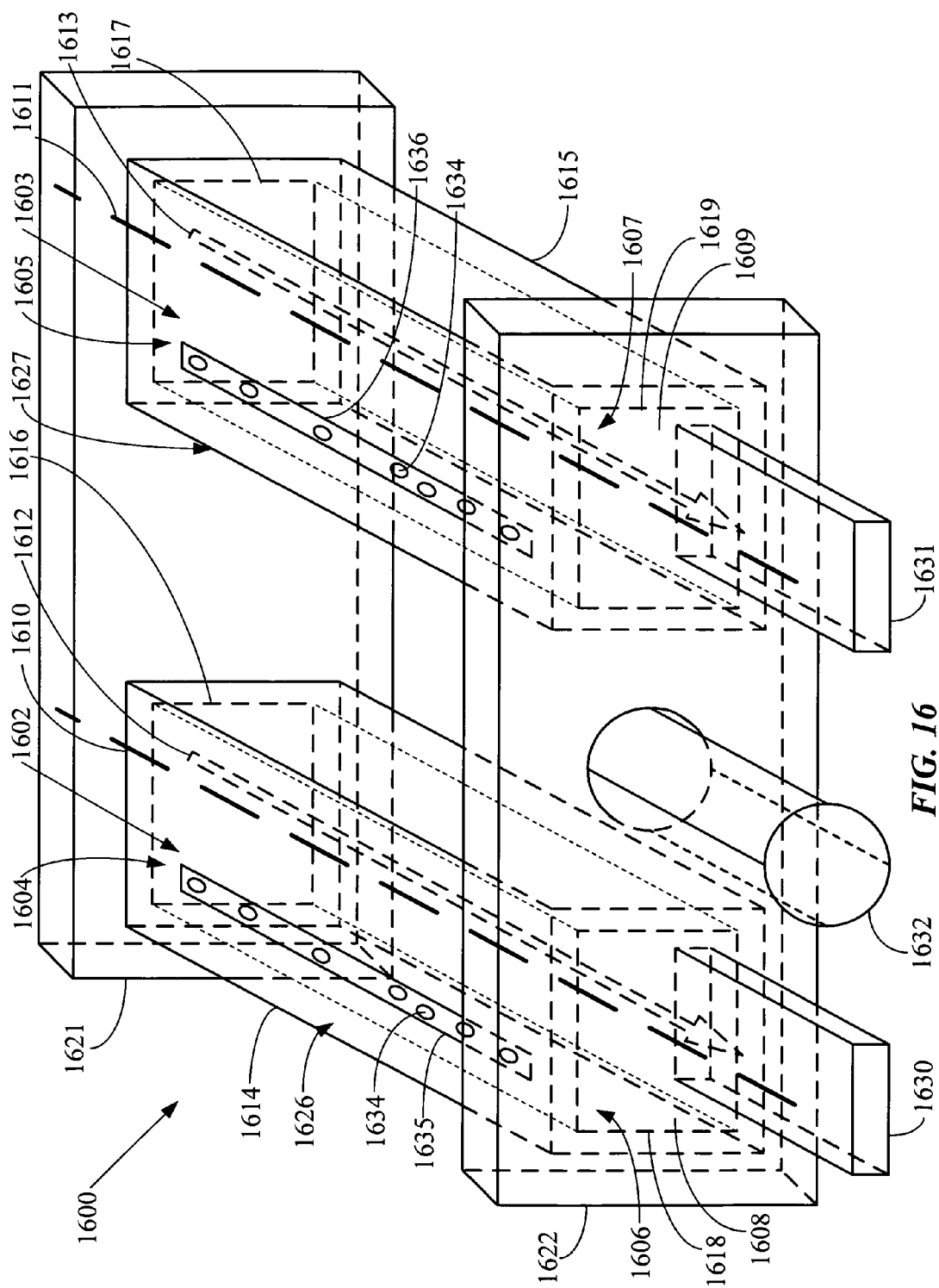
FIG. 16 is a perspective diagram showing an example of an implementation of a further device.

FIG. 16 is a perspective diagram showing an example of an implementation of a further device 1600. The device 1600 includes a first channel 1602 and a second channel 1603. The first channel 1602 has a first channel input 1604 and a first channel output 1606. The first channel 1602 has a first interior channel surface 1608 extending along a longitudinal axis 1610 represented by a dashed line, in a first channel path 1612 represented by an arrow, from the first channel input 1604 to the first channel output 1606. The second channel 1603 has a second channel input 1605 and a second channel output 1607. The second channel 1603 has a second interior channel surface 1609 extending along a longitudinal axis 1611 represented by a dashed line, in a second channel path 1613 represented by an arrow, from the second channel input 1605 to the second channel output 1607. The first channel input 1604 is aligned together with the second channel input 1605, and the first channel output 1606 is aligned together with the second channel output 1607. For example, the first channel input 1604 and the second channel input 1605 may be located next to each other as shown in FIG. 16; and the first channel output 1606 and the second channel output 1607 may be located next to each other also as shown in FIG. 16.

In an example, the device 1600 may include a housing 1614 integrated with the first channel input 1604 and with the first channel output 1606, and surrounding the first channel 1602. In another example, the device 1600 may include a housing 1615 integrated with the second channel input 1605 and with the second channel output 1607, and surrounding the second channel 1603. In examples, the first interior channel surface 1608, extending from the first channel input 1604 to the first channel output 1606, may have raised micro-scale features (not shown) interrupted by a plurality of raised barriers (not shown) spaced apart along the first channel path 1612 on the first interior channel surface 1608. In further examples, the second interior channel surface 1609, extending from the second channel input 1605 to the second channel output 1607, may have raised micro-scale features (not shown) interrupted by a plurality of raised barriers (not shown) spaced apart along the second channel path 1613 on the second interior channel surface 1609. The raised micro-scale features (not shown) in the device 1600 may have dimensions, pitch, pattern, and selected shapes analogous to those discussed earlier with regard to the raised micro-scale features 1226; and may likewise be superhydrophobic. The raised barriers (not shown)) in the device 1600 may have the same patterns and other attributes as discussed earlier with regard to the raised barriers 1228.

The device 1600 may, for example, include orifices 1634 having the same structures as earlier discussed with respect to the orifices 1134 in the device 1100. The orifices 1634 may, as examples, be positioned in first and second regions 1635, 1636 represented by rectangular lines and shown in FIG. 16 on housings 1614, 1615 of each of the first and second channels 1602, 1603 in the same manner as discussed concerning the device 1100. As another example, the orifices 1634 may be located or clustered near upstream edges of raised barriers (not shown) along the first and second channel paths 1612, 1613. Such location or clustering of the orifices 1634 with respect to raised barriers (not shown) may contribute to a flow of a vapor (not shown) near the first and second interior channel surfaces 1608, 1609. The orifices 1634 may, for example, communicate with a conduit (not shown) either within or outside the device 1600 configured for vapor collection and direction to a destination (not shown). Further, for example, such a conduit (not shown) may be integral with a housing 1614, 1615 of the device 1600. In another example, top walls 1626, 1627 of the device 1600 may respectively include membranes (not shown) having the same structures as discussed earlier with respect to the membrane 1402 shown in FIG. 14. Such membranes (not shown) may, for example, be substituted for the orifices 1634. In further examples, one or more of the side and bottom walls of the first and second channels 1602, 1603 may also or alternatively include a membrane (not shown); and a membrane (not shown) may additionally be partially included in two or more of such walls.

The first channel input 1604 and the first channel output 1606 may respectively have first and second internal circumferences 1616, 1618. The second channel input 1605 and the second channel output 1607 may respectively have first and second internal circumferences 1617, 1619. In an example, each of the first and second internal circumferences 1616, 1617, 1618, 1619 may have a rectangular shape as shown in FIG. 16. In further examples (not shown), each of the first and second internal circumferences 1616, 1617, 1618, 1619 may have other shapes as discussed earlier with respect to the first and second internal circumferences 302, 402 of the device 100.

In an example, the device 1600 may have an input manifold 1621 including the first and second channel inputs 1604, 1605. Further, for example, the device 1600 may have an output manifold 1622 including the first and second channel outputs 1606, 1607. The device 1600 may further include first output conduits 1630, 1631 and second output conduit 1632. As an example, the device 1600 may be configured to selectively direct a liquid (not shown) into the first output conduits 1630, 1631, and to selectively direct a vapor (not shown) into the second output conduit 1632. In an example, the first output conduits 1630, 1631 and the second output conduit 1632 may be integral with the output manifold 1622.

In another example (not shown), a device 1600 may include more than two channels such as the channels 1602, 1603 shown in FIG. 16 and discussed above. Such a device 1600 may include, for example, tens, hundreds, thousands, or more channels such as the channels 1602, 1603. Such channels (not shown) may, for example, be aligned together and may have manifolds in various configurations analogous to those shown in FIG. 16 and discussed above.

Materials for forming devices 100, 700, 1100, 1600 may include, as examples, silicon, silicon carbide, graphite, aluminum oxide, porous silicon, inorganic dielectrics including Group 3-5 semiconductors, high-temperature-stable polymers, liquid crystal polymers, metal elements and alloys, and oriented heat-conductive materials. The devices 100, 700, 1100, 1600 may be fabricated utilizing various processes including, as examples, deep submicron lithography, pattern transfer etching, and three-dimensional printing. As further examples, device fabrication techniques disclosed in commonly-owned Kempers et al., U.S. patent application Ser. No. 11/416,893, filed on May 3, 2006 and entitled "Hydrophobic Surfaces and Fabrication Process", also referred to above, may be utilized.

Figure 17:
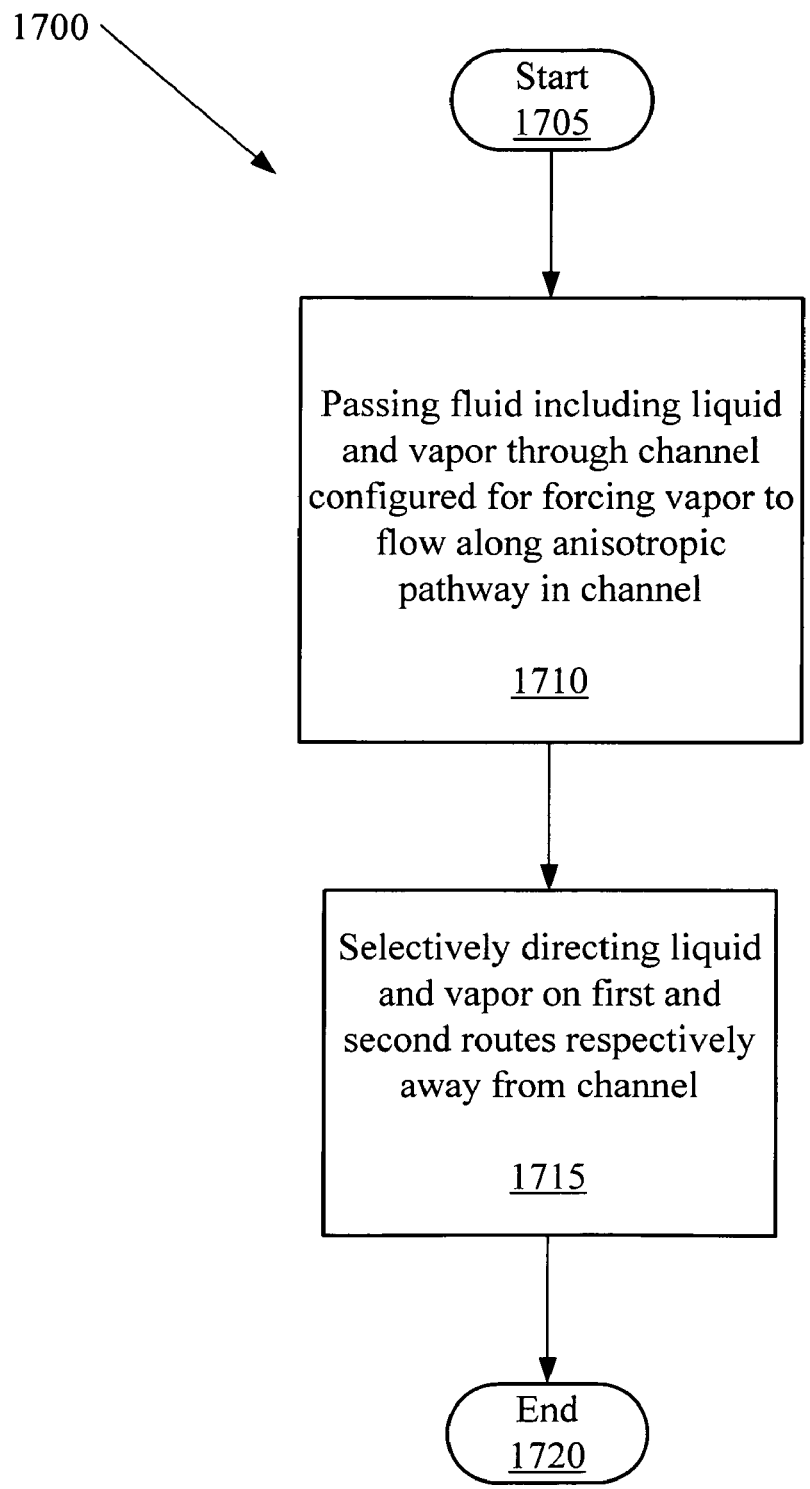
FIG. 17 is a flow chart showing an example of a process.

FIG. 17 is a flow chart showing an example of a process 1700. The process 1700 starts at step 1705, and then step 1710 includes passing a fluid that includes a liquid and a vapor through a first channel having a first channel input, a first channel output, and a first interior channel surface extending along a first channel path from the first channel input to the first channel output. Passing such a fluid that includes a liquid and a vapor may, for example, include heating such a fluid to form such a vapor. The first channel is configured for forcing the vapor to flow along a selected anisotropic pathway in the first channel. In an example, the process 1700 may include, at step 1715, selectively directing liquid on a first route through and then away from the first channel and selectively directing vapor on a second route at least partially through and then away from the first channel. The process 1700 may then end at step 1720.

As another example, passing the fluid through the first channel in step 1710 may include passing the fluid through such a first channel further including a plurality of first channel sections in serial communication along the first channel path, each of the first channel sections including a first internal circumference spaced apart along the first channel path from a second internal circumference, in each of the first channel sections the first and second internal circumferences being substantially different, each of the first channel sections including a sub-surface of the first interior channel surface, and at least a region of the sub-surface of each of the first channel sections including a distribution of raised micro-scale features.

In a further example, passing the fluid through the first channel in step 1710 may include passing the fluid through such a first channel configured so that at least a first region of the first interior channel surface has a distribution of raised micro-scale features interrupted by a plurality of raised barriers spaced apart along the first channel path on the first interior channel surface, each raised barrier extending on the first interior channel surface in directions that are partially transverse to a longitudinal axis of the first channel and are partially parallel to the longitudinal axis.

As an additional example, step 1710 may further include passing the fluid in parallel through a second channel along with the first channel, the second channel having a second channel input, a second channel output, and a second interior channel surface, wherein the second channel is configured for forcing the vapor to flow along a selected anisotropic pathway in the second channel.

It is understood that the various features of any one of the devices 100, 700, 1100, 1600 discussed above and shown in FIGS. 1-16 may be combined with or modified in accordance with the teachings herein regarding one or more others of the devices 100, 700, 1100, 1600. Accordingly, the discussions of each of the devices 100, 700, 1100, 1600 including the figures referred to in each of such discussions, are all hereby incorporated by reference in the discussion herein of each of the other devices 100, 700, 1100, 1600.

The devices 100, 700, 1100, 1600 may, for example, be utilized as conduits for carrying a fluid including both liquid and vapor components from a first location to a second location. The vapor component may be generated, as examples, by evaporation of a liquid in the conduit, or outside of the conduit. As examples, the internal structures of the devices 100, 700, 1100, 1600 may force a vapor to flow along an anisotropic pathway in a channel of such devices 100, 700, 1100, 1600. This anisotropic vapor flow may, as an example, generate a shear force in a device 100, 700, 1100, 1600 propelling a liquid along a channel path through the device 100, 700, 1100, 1600. This anisotropic vapor flow may also, for example, reduce a pressure drop along a channel path within a device 100, 700, 1100, 1600. Further, for example, the raised micro-scale features may reduce flow resistance of a liquid within the devices 100, 700, 1100, 1600. The devices 100, 700, 1100, 1600 may facilitate a flow of a liquid along such a channel path either discontinuously in the form of droplets or slugs, or continuously in the form of a strand. Additionally, for example, the raised micro-scale features may provide a pathway near an internal channel surface through the devices 100, 700, 1100, 1600 for a vapor layer having a suitable thickness for supporting a low-pressure-drop, low-friction flow of a liquid through the devices 100, 700, 1100, 1600. The devices 100, 700, 1100, 1600 may be configured, for example, for generating such a low-pressure-drop, low-friction flow of a liquid through the devices 100, 700, 1100, 1600 at any temperature that is suitable for generating a vapor flow through the devices 100, 700, 1100, 1600. While the foregoing description refers in some instances to the devices 100, 700, 1100, 1600, it is appreciated that the subject matter is not limited to these devices, nor to the devices discussed in the specification. Other configurations of devices may be utilized consistent with the teachings herein. As a further example, the devices 100, 700, 1100, 1600 may be utilized together with the devices and methods disclosed in the commonly-owned and simultaneously-filed Basavanhally et al., U.S. patent application entitled "Thermal Energy Transfer Device", 12/080,408, the entirety of which hereby is incorporated herein by reference.

The process 1700 may be utilized in connection with passing a fluid having a liquid and a vapor through a suitable device including a channel having a channel input, a channel output, and an interior channel surface extending along a channel path from the channel input to the channel output, wherein the channel may be configured for forcing the vapor to flow along a selected anisotropic pathway in the channel. The devices 100, 700, 1100, 1600 are examples of such suitable devices. The process 1700 may, as examples, include additional steps and modifications of the indicated steps.

Moreover, it will be understood that the foregoing description of numerous examples has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

What is claimed is:

1. A device, comprising:
   a first channel with a first channel input and a first channel output, the first channel having a first interior channel surface extending along a first channel path from the first channel input to the first channel output;
   the first channel including a plurality of first channel sections in serial communication along the first channel path;
   each of the first channel sections including a first internal circumference spaced apart along the first channel path from a second internal circumference, in each of the first channel sections the first and second internal circumferences being substantially different;
   wherein each of the first channel sections includes a sub-surface of the first interior channel surface, and wherein at least a region of the sub-surface of each of the first channel sections includes a distribution of raised micro-scale features.

2. The device of claim 1, wherein each of the first channel sections includes a progressively varying internal circumference along the first channel path.

3. The device of claim 1, wherein substantially all of the first interior channel surface of each of the first channel sections includes raised micro-scale features.

4. The device of claim 1, including first and second output conduits in communication with the first channel output, wherein the device is configured to selectively direct a liquid into the first output conduit and to selectively direct a vapor into the second output conduit.

5. The device of claim 1, including
   a second channel with a second channel input and a second channel output, the second channel having a second interior channel surface extending along a second channel path from the second channel input to the second channel output;
   the second channel including a plurality of second channel sections in serial communication along the second channel path;
   each of the second channel sections including a first internal circumference spaced apart along the second channel path from a second internal circumference, in each of the second channel sections the first and second internal circumferences being substantially different;
   wherein each of the second channel sections includes a sub-surface of the second interior channel surface, and wherein at least a region of the sub-surface of each of the second channel sections includes a distribution of raised micro-scale features; and
   wherein the first channel input is aligned together with the second channel input, and the first channel output is aligned together with the second channel output.

6. The device of claim 5, having an input manifold including the first and second channel inputs, and having an output manifold including the first and second channel outputs.

7. The device of claim 6, including first and second output conduits in communication with the output manifold, wherein the device is configured to selectively direct a liquid into the first output conduit and to selectively direct a vapor into the second output conduit.

8. A device, comprising:
   a first channel with a first channel input and a first channel output, the first channel having a first interior channel surface extending around a longitudinal axis along a first channel path from the first channel input to the first channel output;
   wherein at least a first region of the first interior channel surface includes a distribution of raised micro-scale features interrupted by a plurality of raised barriers spaced apart along the first channel path on the first interior channel surface, each raised barrier extending on the first interior channel surface in directions that are partially transverse to the longitudinal axis and are partially parallel to the longitudinal axis.

9. The device of claim 8, including a housing integrated with the first channel input and with the first channel output, and surrounding the first channel.

10. The device of claim 9, wherein the first channel has an internal circumference around the longitudinal axis and along the first channel path, wherein the first region of the first interior channel surface is oriented on the internal circumference below a second region of the first interior channel surface, and wherein the second region of the first interior channel surface includes a plurality of orifices configured for conducting a vapor through the first interior channel surface and out of the device.

11. The device of claim 9, wherein the first channel has an internal circumference around the longitudinal axis and along the first channel path, wherein the first region of the first interior channel surface is oriented on the internal circumference below a second region of the first interior channel surface, and wherein the first region of the first interior channel surface includes a plurality of orifices configured for conducting a vapor through the first interior channel surface and out of the device.

12. The device of claim 10, wherein the second region of the first interior channel surface includes a membrane, wherein the membrane has an outer membrane surface, an inner membrane surface forming a region of the first interior channel surface, and a plurality of the orifices, wherein the orifices have inner orifice ends at the first interior channel surface and outer orifice ends at the outer membrane surface; and wherein the outer membrane surface communicates with a conduit having an outlet from the housing.

13. The device of claim 12, wherein the device is configured to selectively direct a liquid to the first channel output and to selectively direct a vapor through the orifices into the conduit.

14. The device of claim 8, including:
a second channel with a second channel input and a second channel output, the second channel having a second interior channel surface extending around a longitudinal axis along a second channel path from the second channel input to the second channel output;
wherein at least a first region of the second interior channel surface includes a distribution of raised micro-scale features interrupted by a plurality of raised barriers spaced apart along the second channel path on the second interior channel surface, each raised barrier extending on the second interior channel surface in directions that are partially transverse to the longitudinal axis and are partially parallel to the longitudinal axis;
wherein the first channel input is aligned together with the second channel input, and the first channel output is aligned together with the second channel output.

15. The device of claim 14, having an input manifold including the first and second channel inputs, and having an output manifold including the first and second channel outputs.

16. A process, including:
passing a fluid that includes a liquid and a vapor through a first channel having a first channel input, a first channel output, and a first interior channel surface extending along a first channel path from the first channel input to the first channel output, at least a first region of the first interior channel surface including a distribution of raised micro-scale features, wherein the first channel is configured for forcing the vapor to flow along a selected anisotropic pathway in the first channel.

17. The process of claim 16, including selectively directing liquid on a first route through and then away from the first channel and selectively directing vapor on a second route at least partially through and then away from the first channel.

18. The process of claim 16, wherein passing the fluid through the first channel includes passing the fluid through such a first channel that further includes a plurality of first channel sections in serial communication along the first channel path,
each of the first channel sections including a first internal circumference spaced apart along the first channel path from a second internal circumference, in each of the first channel sections the first and second internal circumferences being substantially different,
each of the first channel sections including a sub-surface of the first interior channel surface, and at least a region of the sub-surface of each of the first channel sections includes the distribution of raised micro-scale features.

19. The process of claim 16, wherein passing the fluid through the first channel includes passing the fluid through a first channel in which at least a first region of the first interior channel surface includes the distribution of raised micro-scale features, interrupted by a plurality of raised barriers spaced apart along the first channel path on the first interior channel surface, each raised barrier extending on the first interior channel surface in directions that are partially transverse to a longitudinal axis and are partially parallel to the longitudinal axis.

20. The process of claim 16, including passing the fluid in parallel through the first channel and a second channel, the second channel having a second channel input, a second channel output, and a second interior channel surface, wherein the second channel is configured for forcing the vapor to flow along a selected anisotropic pathway in the second channel.

* * * * *